United States Patent [19]

Tayama et al.

[11] Patent Number: 5,142,361
[45] Date of Patent: Aug. 25, 1992

[54] MOTION VECTOR DETECTING APPARATUS FOR VIDEO TELEPHONE/TELECONFERENCE SYSTEMS

[75] Inventors: Masashi Tayama; Hiroshi Fujiwara; Masanori Maruyama, all of Tokyo, Japan

[73] Assignee: Graphics Communication Technologies, Ltd., Tokyo, Japan

[21] Appl. No.: 717,894

[22] Filed: Jun. 19, 1991

[30] Foreign Application Priority Data

Jun. 21, 1990 [JP] Japan .............................. 2-161313

[51] Int. Cl.⁵ .............................................. H04N 7/13
[52] U.S. Cl. .................................... 358/105; 358/136
[58] Field of Search ............... 358/105, 136, 133, 140, 358/85

[56] References Cited

U.S. PATENT DOCUMENTS 4,800,425  1/1989  Schwerzel et al. ............. 358/105 X
5,012,337  4/1991  Gillard .......................... 358/105 X Primary Examiner—Victor R. Kostak
Attorney, Agent, or Firm—Iandiorio & Dingman

[57] ABSTRACT

A motion vector detecting apparatus for detecting motion vectors based on a current frame data and the preceding frame data. In the motion vector detecting apparatus, first and second memories are provided in order to store the current frame data and the preceding frame data. Additionally, a number of first cache memories, a number of second cache memories, a control circuit, and a motion vector calculation circuit are provided. The control circuit selects the input cache memories into which pixel data are to be written, and the output cache memories, from which pixel data are to be read out, from the first and second cache memories, so that the input cache memories and the output cache memories have no redundant cache memory. Pixel data corresponding to the detection image blocks stored in the first memory and pixel data corresponding to the search image blocks stored in the second memory are sequentially written in the selected input cache memories of the first and second cache memories. Simultaneously, the pixel data corresponding to the detection image blocks and the search image blocks are sequentially read out from the selected output cache memories, and are sequentially supplied to the motion vector calculation circuit.

3 Claims, 13 Drawing Sheets

FIG. 3

| CACHE MEMORY | MEMORY ACCESS CYCLE | | | | | |
|---|---|---|---|---|---|---|
| | t0 | t1 | t2 | t3 | t4 | t5 |
| b 30 | b0 WRITE | --- | b0 OUTPUT (CALCULATION) | b3 WRITE | b3 OUTPUT (CALCULATION) | b3 OUTPUT (CALCULATION) |
| 31 | --- | b1 WRITE | b1 OUTPUT (CALCULATION) | b1 OUTPUT (CALCULATION) | b4 WRITE | b4 OUTPUT (CALCULATION) |
| 32 | --- | --- | b2 WRITE | b2 OUTPUT (CALCULATION) | b2 OUTPUT (CALCULATION) | b5 WRITE |
| a 20 | --- | a0 WRITE | a0 OUTPUT (CALCULATION) | a2 WRITE | a2 OUTPUT (CALCULATION) | a4 WRITE |
| 21 | --- | --- | a1 WRITE | a1 OUTPUT (CALCULATION) | a3 WRITE | a3 OUTPUT (CALCULATION) | a0~a4: DETECTION IMAGE BLOCKS
b0~b5: HALF SEARCH RANGES

| DETECTION IMAGE BLOCK | SEARCH RANGE | |
|---|---|---|
| | LEFT HALF RANGE | RIGHT HALF RANGE |
| a0 | b0 | b1 |
| a1 | b1 | b2 |
| a2 | b2 | b3 |
| a3 | b3 | b4 |
| a4 | b4 | b5 |
| ⋮ | ⋮ | ⋮ |

FIG. 7
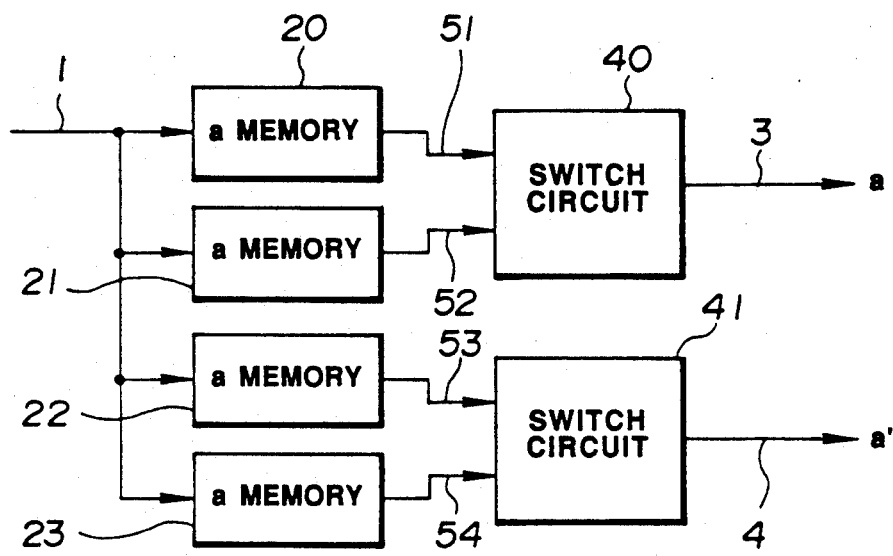
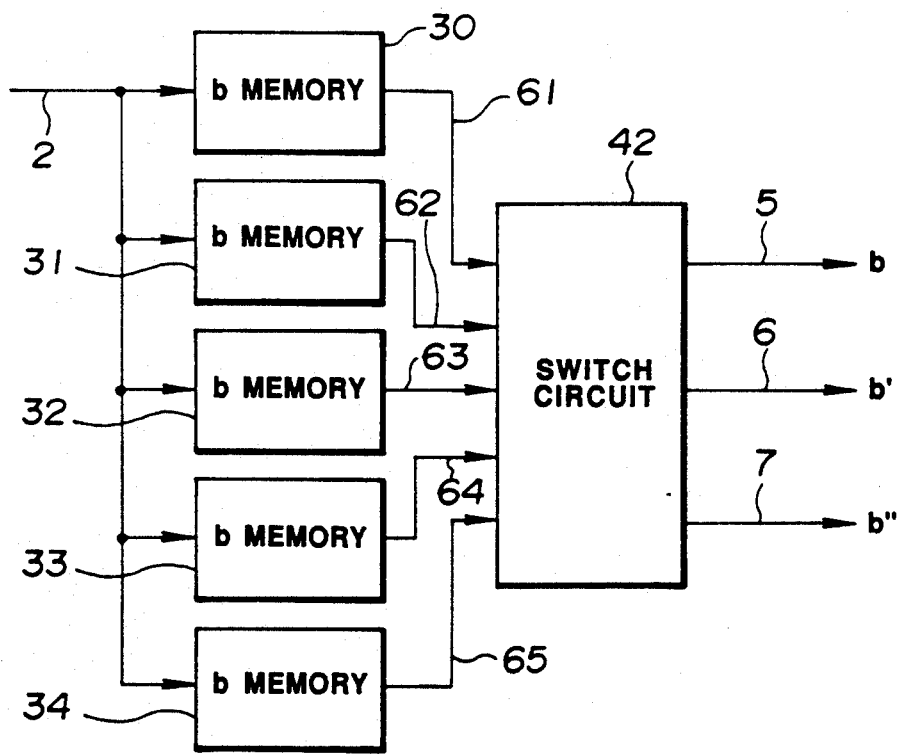

FIG. 8

| CACHE MEMORY | t0 | t1 | t2 | t3 | t4 | t5 | t6 | t7 | t8 | ... |
|---|---|---|---|---|---|---|---|---|---|---|
| 30 | b0 WRITE | — | — | b0 OUTPUT (FIRST CALCULATION SECTION) | — | — | — | b5 OUTPUT (FIRST, SECOND CALCULATION SECTION) | — | ... |
| 31 | | b1 WRITE | — | b1 OUTPUT (FIRST, SECOND CALCULATION SECTION) | — | b5 WRITE | — | b6 OUTPUT (SECOND CALCULATION SECTION) | — | ... |
| 32 | | | b2 WRITE | b2 OUTPUT (SECOND CALCULATION SECTION) | — | b2 OUTPUT (FIRST CALCULATION SECTION) | — | b7 WRITE | — | ... |
| 33 | | | | b3 WRITE | — | b3 OUTPUT (FIRST, SECOND CALCULATION SECTION) | b6 WRITE | — | b8 WRITE | ... |
| 34 | | | | | b4 WRITE | b4 OUTPUT (SECOND CALCULATION SECTION) | — | b4 OUTPUT (FIRST CALCULATION SECTION) | — | ... |
| 20 | — | a0 WRITE | — | a0 OUTPUT (FIRST CALCULATION SECTION) | — | a4 WRITE | — | a4 OUTPUT (FIRST CALCULATION SECTION) | — | ... |
| 21 | — | — | — | a2 WRITE | — | a2 OUTPUT (FIRST CALCULATION SECTION) | — | a6 WRITE | — | ... |
| 22 | — | — | a1 WRITE | a1 OUTPUT (SECOND CALCULATION SECTION) | — | — | a5 WRITE | a5 OUTPUT (SECOND CALCULATION SECTION) | — | ... |
| 23 | — | — | — | — | a3 WRITE | a3 OUTPUT (SECOND CALCULATION SECTION) | — | — | a7 WRITE | ... |

MEMORY ACCESS CYCLE b (rows 30–34), a (rows 20–23)

b0~b6: HALF SEARCH RANGE
a0~a6: DETECTION IMAGE BLOCK

FIG. 10

| DETECTION IMAGE BLOCK | SEARCH RANGE | | MOTION VECTOR CALCULATION SECTION |
|---|---|---|---|
| | LEFT HALF RANGE | RIGHT HALF RANGE | |
| a0 | b0 | b1 | 112   113 |
| a1 | b1 | b2 | |
| a2 | b2 | b3 | 112   113 |
| a3 | b3 | b4 | |
| a4 | b4 | b5 | 112   113 |
| a5 | b5 | b6 | |
| a6 | b6 | b7 | 112   113 |
| a7 | b7 | b8 | |
| --- | --- | --- | 112   113 --- |

| a(0,0) | a(0,1) | a(0,2) |
|---|---|---|
| a(1,0) | a(1,1) | a(1,2) |
| a(2,0) | a(2,1) | a(2,2) | a(i,j)=INPUT BLOCK

| b(0,0) | b(0,1) | b(0,2) | b(0,3) | b(0,4) |
|---|---|---|---|---|
| b(1,0) | b(1,1) | b(1,2) | b(1,3) | b(1,4) |
| b(2,0) | b(2,1) | b(2,2) | b(2,3) | b(2,4) |
| b(3,0) | b(3,1) | b(3,2) | b(3,3) | b(3,4) |
| b(4,0) | b(4,1) | b(4,2) | b(4,3) | b(4,4) |

200B

INPUT b     INPUT b'

BLOCKS OF SEARCH RANGE

FIG. 14

| | | | CALCULATION CIRCUIT 151 | CALCULATION CIRCUIT 152 | CALCULATION CIRCUIT 153 |
|---|---|---|---|---|---|
| 0 | a(0,0) b(0,0) | | a(0,0)-b(0,0) | | |
| 1 | a(0,1) b(0,1) | | a(0,1)-b(0,1) | a(0,0)-b(0,1) | |
| 2 | a(0,2) b(0,2) | | a(0,2)-b(0,2) | a(0,1)-b(0,2) | a(0,0)-b(0,2) |
| 3 | a(1,0) b(1,0) | b(0,3) | a(1,0)-b(1,0) | a(0,2)-b(0,3) | a(0,1)-b(0,3) |
| 4 | a(1,1) b(1,1) | b(0,4) | a(1,1)-b(1,1) | a(1,0)-b(1,1) | a(0,2)-b(0,4) |
| 5 | a(1,2) b(1,2) | | a(1,2)-b(1,2) | a(1,1)-b(1,2) | a(1,0)-b(1,2) |
| 6 | a(2,0) b(2,0) | b(1,3) | a(2,0)-b(2,0) | a(1,2)-b(1,3) | a(1,1)-b(1,3) |
| 7 | a(2,1) b(2,1) | b(1,4) | a(2,1)-b(2,1) | a(2,0)-b(2,1) | a(1,2)-b(1,4) |
| 8 | a(2,2) b(2,2) | | a(2,2)-b(2,2) | a(2,1)-b(2,2) | a(2,0)-b(2,2) |
| 9 | a(0,0) b(1,0) | b(2,3) | a(0,0)-b(1,0) | a(2,2)-b(2,3) | a(2,1)-b(2,3) |
| 10 | a(0,1) b(1,1) | b(2,4) | a(0,1)-b(1,1) | a(0,0)-b(1,1) | a(2,2)-b(2,4) |
| 11 | a(0,2) b(1,2) | | a(0,2)-b(1,2) | a(0,1)-b(1,2) | a(0,0)-b(1,2) |
| 12 | a(1,0) b(2,0) | b(1,3) | a(1,0)-b(2,0) | a(0,2)-b(1,3) | a(0,1)-b(1,3) |
| 13 | a(1,1) b(2,1) | b(1,4) | a(1,1)-b(2,1) | a(1,0)-b(2,1) | a(0,2)-b(1,4) |
| 14 | a(1,2) b(2,2) | | a(1,2)-b(2,2) | a(1,1)-b(2,2) | a(1,0)-b(2,2) |
| 15 | a(2,0) b(3,0) | b(2,3) | a(2,0)-b(3,0) | a(1,2)-b(2,3) | a(1,1)-b(2,3) |
| 16 | a(2,1) b(3,1) | b(2,4) | a(2,1)-b(3,1) | a(2,0)-b(3,1) | a(1,2)-b(2,4) |
| 17 | a(2,2) b(3,2) | | a(2,2)-b(3,2) | a(2,1)-b(3,2) | a(2,0)-b(3,2) |
| 18 | a(0,0) b(2,0) | b(3,3) | a(0,0)-b(2,0) | a(2,2)-b(3,3) | a(2,1)-b(3,3) |
| 19 | a(0,1) b(2,1) | b(3,4) | a(0,1)-b(2,1) | a(0,0)-b(2,1) | a(2,2)-b(3,4) |
| 20 | a(0,2) b(2,2) | | a(0,2)-b(2,2) | a(0,1)-b(2,2) | a(0,0)-b(2,2) |
| 21 | a(1,0) b(3,0) | b(2,3) | a(1,0)-b(3,0) | a(0,2)-b(2,3) | a(0,1)-b(2,3) |
| 22 | a(1,1) b(3,1) | b(2,4) | a(1,1)-b(3,1) | a(1,0)-b(3,1) | a(0,2)-b(2,4) |
| 23 | a(1,2) b(3,2) | | a(1,2)-b(3,2) | a(1,1)-b(3,2) | a(1,0)-b(3,2) |
| 24 | a(2,0) b(4,0) | b(3,3) | a(2,0)-b(4,0) | a(1,2)-b(3,3) | a(1,1)-b(3,3) |
| 25 | a(2,1) b(4,1) | b(3,4) | a(2,1)-b(4,1) | a(2,0)-b(4,1) | a(1,2)-b(3,4) |
| 26 | a(2,2) b(4,2) | | a(2,2)-b(4,2) | a(2,1)-b(4,2) | a(2,0)-b(4,2) |
| 27 | | b(4,3) | | a(2,2)-b(4,3) | a(2,1)-b(4,3) |
| 28 | | b(4,4) | | | a(2,2)-b(4,4) |
| 29 | | | | | |

MOTION VECTOR DETECTING APPARATUS FOR VIDEO TELEPHONE/TELECONFERENCE SYSTEMS

BACKGROUND OF THE INVENTION

1. Field of the Invention

The present invention relates to a motion vector detecting apparatus employed in video telephone systems or video teleconference systems in which moving picture signals are compressed at a high compression ratio and the compressed signals are transmitted to destination devices.

2. Prior Art

In video telephone systems or video teleconference systems, moving picture signals to be transmitted have an extremely large amount of information, so that the moving picture signals must be compressed at a high compression ratio before transmission. There is a sequential frame differential compression method which satisfies this requirement of the compression of moving picture signals.

In this method, differences between pixel data of current frame to be transmitted and pixel data of a corresponding preceding frame which has been transmitted are respectively calculated, after which the calculated differences are transmitted as sequential frame differential error data instead of transmitting the pixel data.

This method is effective in the case of transmitting moving pictures having no or little motion because there is a high sequential correlation in respective neighboring frames, and the moving picture data can be compressed at a high compression ratio. However, there is a problem in that in the case of transmitting moving pictures having active motion, the amount of data to be transmitted increases because there is low sequential correlation in respective neighboring frames.

In order to overcome the problem described above, a motion compensation sequential frame differential compression method is used. In this method, before calculating the sequential frame differential error data based on the pixel data of a current frame and the pixel data of the preceding frame, a motion vector is calculated based on the current frame and the preceding frame. After this, modifying the respective pixel data of the preceding frame so that the image constituted by the modified pixel data moves according to the calculated motion vector, and then calculating the sequential frame differential error data based on the pixel data of the current frame and the modified pixel data of the preceding frame, the sequential frame differential error data and the motion vector are transmitted.

Hereinafter, description of an idea of a motion vector will be given in detail with reference to FIG. 11. In FIG. 11, 100 designates a screen comprising a current frame, and 200 designates the preceding screen comprising the preceding frame. 100A is a image block included in the current screen 100, and corresponds to a image block 200A which is included in the preceding screen 200. In the preceding screen 200, the block 100A is indicated by dot lines, so that the position of the image block 100A in the screen 200 equals that in the screen 100. The motion vector is defined as the arrow line V which runs from the central point of the block 100A to the central point of the block 200A in the image 200.

In order to determine that the arrow line V is the motion vector, it is necessary to evaluate whether or not the image block 100A has the same image as the image block 200A. This evaluation is carried out according to the following method, for example. The evaluation method will be described assuming a case in which both image block 100A and image block 200A are constituted by the same size matrix, for example an M × M pixel matrix. First, the concentration differences between the pixels of the image block 100A and the corresponding pixels of the image block 200A are calculated, after which the absolute values of the calculated differences are respectively calculated, after which the obtained absolute values are summed. This results in the cost data Dij, shown in the formula (1), which indicate the difference between the image of the image block 100A and the image of the image block 200A. In the formula (1), a(i,j) corresponds to the concentration of a pixel included in the image block 100A, and b(k+i, l+j) corresponds to the concentration of the corresponding pixel included in the image block 200A.

$$Dij = \sum_{i,j}^{M} ABS\{a(i,j) - b(i + k, l + j)\} \quad (1)$$

Next, the Dij are judged based on predetermined reference data. When the cost data are less than the reference data, this indicates that the image blocks 100A and 200A have the same image, whereas when the Dij are greater than those of the reference data, this indicates that the image of the image block 100A is different from that of the image block 200A. There are other evaluation methods for evaluating the difference between the two image blocks. For example, there is an evaluation method in which the squares of the concentration differences of pixel pairs are calculated, after which the calculated squares are summed together, thereby resulting in the Dij.

In the case where the evaluation result indicates that the image of the image block 200A is different from the image of the image block 100A, the same evaluations are repeatedly performed sequentially using the other image blocks in the vicinity of the image block 200A until an image block is discovered from a preceding screen 200, which has cost data which are less than the reference data.

In the other method, in which a range defined in the screen 100, evaluation are performed using the respective image blocks included in the range, and a search is conducted for the image block which presents the minimum Dij, the image block for which the search is conducted is taken to correspond to the image block 100A in the current screen.

There are various methods for evaluating image blocks and for selecting image blocks based on the evaluation result. A preferable method is selected and used for detecting motion vectors, considering the required accuracy, signal transmission rate, and the other requirements in connection with the hardware and systems.

Hereinafter, the image blocks, for example the image block 100A, included in the current screen, and compared with the image block of the preceding screen, will be term "detection image blocks", since these blocks are evaluated in order to detect a motion vector. There are some methods for determining the range which includes the detection image blocks. There is a typical method in which the image block in the preceding screen 200A, positioned at the same position of the detection image block 100A, is determined to be a central image block which is to be compared with the detection block 100A, and a range having a constant square and surrounding the determined central image block is determined to be the range in which a search is conducted for image blocks corresponding to the detection image blocks. In this method, the size of the range can be determined at will. However, in the conventional method, in which in the case where the size of the detection image block is M×M, the size of the range is conventionally determined to be 2M×2M or (2M−1)×(2M−1).

Accordingly, in the case of using the method described above, there is a problem in that the number of the evaluations for detecting the motion vector becomes extremely large, so that extremely large calculation steps are required because evaluations must be performed which consider all cases in which the detection image block can be moved from the respective positions included in the area of the preceding screen determined by the size of the range described above. For example, in the case where the search range is (2M−1)×(2M−1), the evaluation time of the cost data is $M \times M = M^2$. That is, in the case where M=16, the number of calculations equals 256. This number of evaluations is coincident with the number of the pixels included in a range in which the center pixel of the search image block can be moved.

In order to improve the throughput of motion vector detecting apparatuses, it is necessary to reduce the number of calculations for detecting motion vectors. For that reason, the inventor of the present invention previously presented an invention capable of reducing the number of evaluations. The invention was filed with the Japanese Patent Office as Japanese Patent Application No. 1-244454. Hereinafter, a description will be given of the motion vector detecting apparatus disclosed in the above described application, with reference to FIGS. 12 through 14. For instance, the configuration used for the case in which M=3, the size of detection block is M×M, and the search range for the image block corresponding to the detection block is 5×5 is shown in FIGS. 12 and 13, for example. In FIG. 13, 200B designates the range in which a search is conducted for an image block corresponding to the detection image block. The detection image block shown in FIG. 12 is positioned in the center of the search range 200B shown in FIG. 13. In the motion vector apparatus, the search range 200B is divided into a left half search range block b and a right half search range block b'. Additionally, in the motion vector detecting apparatus, the left half search range block and the right half search range block are entered into a motion vector calculation section, whereby the motion vector is calculated based on the entered blocks.

FIG. 15 is a block diagram showing a configuration of the motion vector detecting apparatus disclosed in the above-described application. In FIG. 15, 150 designates an input data selection circuit; 151 through 153 respectively designate calculation circuits; 154 designates an output data selection circuit; 155 designates a minimum value detection circuit, and 156 designates a control signal generation circuit. These elements 151 through 156 described above constitute a motion vector detecting section. The control signal generation circuit 155 generates control signals and supplies the generated control signals to the other elements. FIG. 14 shows the operation of the motion vector detecting section shown in FIG. 15. Hereinafter, the operation of the motion vector detecting section will be described with reference to FIG. 14. Pixel data a (i,j) which constitute an input image block a included in a current screen are sequentially supplied to the first input terminal of the input data selection circuit 150. On the other hand, pixel data b(i,j) included in a preceding screen are divided into two series of input pixel data b and b'. The input pixel data b and b' are sequentially supplied to the second input terminal and third input terminal of the input data selection circuit 150. The input data selection circuit 150 arranges pairs of pixel data a(i,j) and b(k+i,l+j), pairs of pixel data a(i,j) and b(k+i,l+1+j), and pairs of pixel data a(i,j) and b(k+i,l+2+j), and these pairs are thereby respectively supplied to the calculation circuits 151 through 153. The calculation circuits 151 through 153 respectively calculate Dij based on the pairs of pixel data entered therein. The Dij calculated by the calculation circuits 151 through 153 are entered in the minimum value detection circuit 155. The minimum value detection circuit 155 compares the Dij sequentially entered therein, and detects a Dij having a minimum value. The motion vector is determined based on the timing at which the cost data having the minimum value is obtained.

However, there is no device which can supply pixel data to the motion vector detecting section shown in FIG. 10 in the required manner shown in FIG. 14, so that the motion vector detecting apparatus shown in FIG. 15 is not effectively driven.

SUMMARY OF THE INVENTION

It is an object of the present invention to provide a motion vector detecting apparatus capable of reducing the evaluation time required for detecting a motion vector.

In an aspect of the present invention, there is provided a motion vector detecting apparatus for detecting motion vector determined based on current frame data including a number of pixel data and the preceding frame data which had been immediately previously entered therein, said motion vector detecting apparatus comprising:

first storing means for storing said current frame data;

second storing means for storing said preceding frame data;

first temporary storing means for storing pixel data supplied from said first storing means, said first temporary storing means having a number of cache memories;

a number of second temporary storing means for storing pixel data supplied from said second storing means, said second temporary storing means having a number of cache memories;

access control means for controlling the read and write operations of said first and second storing means and said first and second temporary storing means, said access control means performing a first transfer operation, in which cache memories of said first and second temporary storing means are sequentially selected as input cache memories in which pixel data are to be written, and pixel data corresponding to the detection image blocks included in the current frame data and pixel data corresponding to the neighboring image blocks included in the preceding frame data are transferred respectively from the first and second storing means respectively to the selected input cache memories of the first and second temporary storing means; the access control means further performing a second transfer operation, in which cache memories of said first and second temporary storing means, into which nothing is being written, are sequentially selected as output cache memories from which pixel data are to be read out pixel data, and pixel data corresponding to the detection image blocks stored in the selected output cache memories of the first temporary storing means and pixel data corresponding to the neighboring image blocks stored in the selected output cache memories of said second temporary storing means are sequentially read out therefrom;

motion vector calculation means for sequentially evaluating the correlation between pixel data read out from said first temporary storing means and pixel data read out from said second temporary storing means, and detecting said motion vector based on that one of the image blocks read out from the second temporary means which has the highest correlation.

The other objects and features of this invention will be understood from the following description with reference to the accompanying drawings.

BRIEF DESCRIPTION OF THE DRAWINGS

FIGS. 3 through 5 show the operation of the motion vector detecting apparatus shown in FIG. 1;

FIG. 7 is a block diagram showing a configuration of a data dividing circuit 114 provided in the motion vector detecting apparatus shown in FIG. 6;

FIGS. 8 through 10 show the operation of the motion vector detecting apparatus shown in FIG. 6;

FIGS. 12 through 14 show a conventional operation for detecting a motion vector;

DESCRIPTION OF PREFERRED EMBODIMENTS

First Preferred Embodiment

Figure 1:
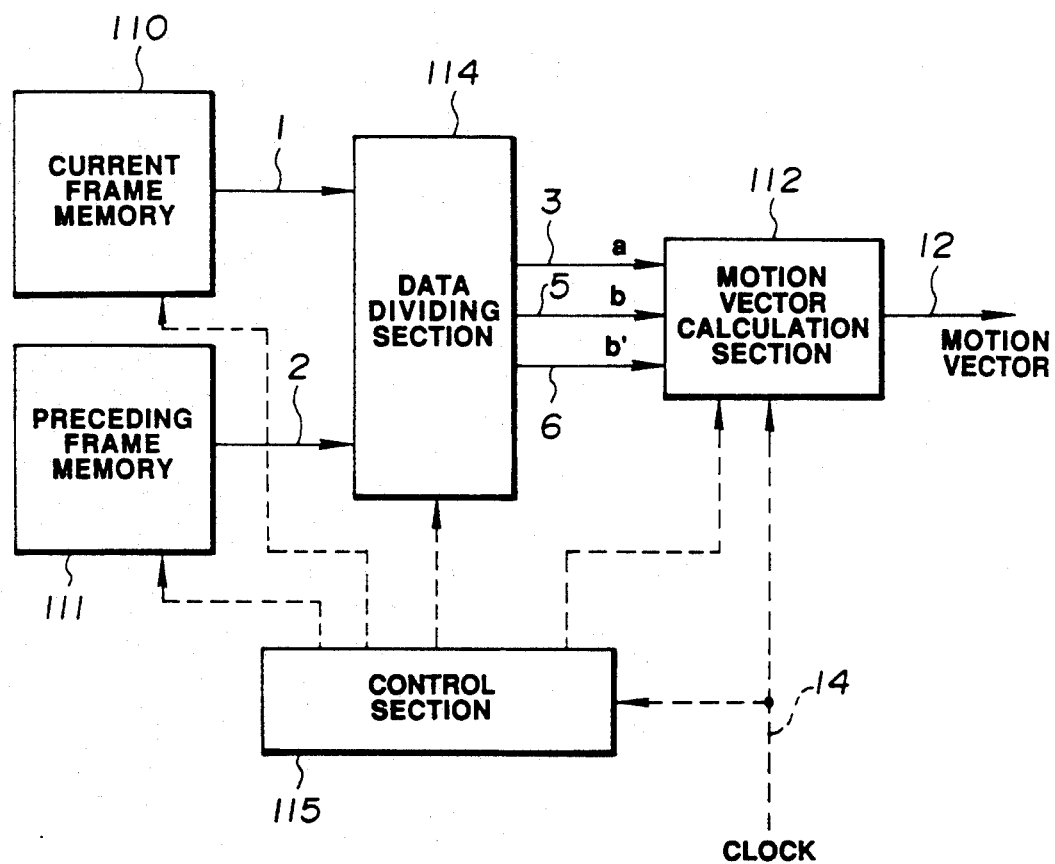
FIG. 1 is a block diagram showing a configuration of a motion vector detecting apparatus according to a first preferred embodiment of the present invention.
Figure 2:
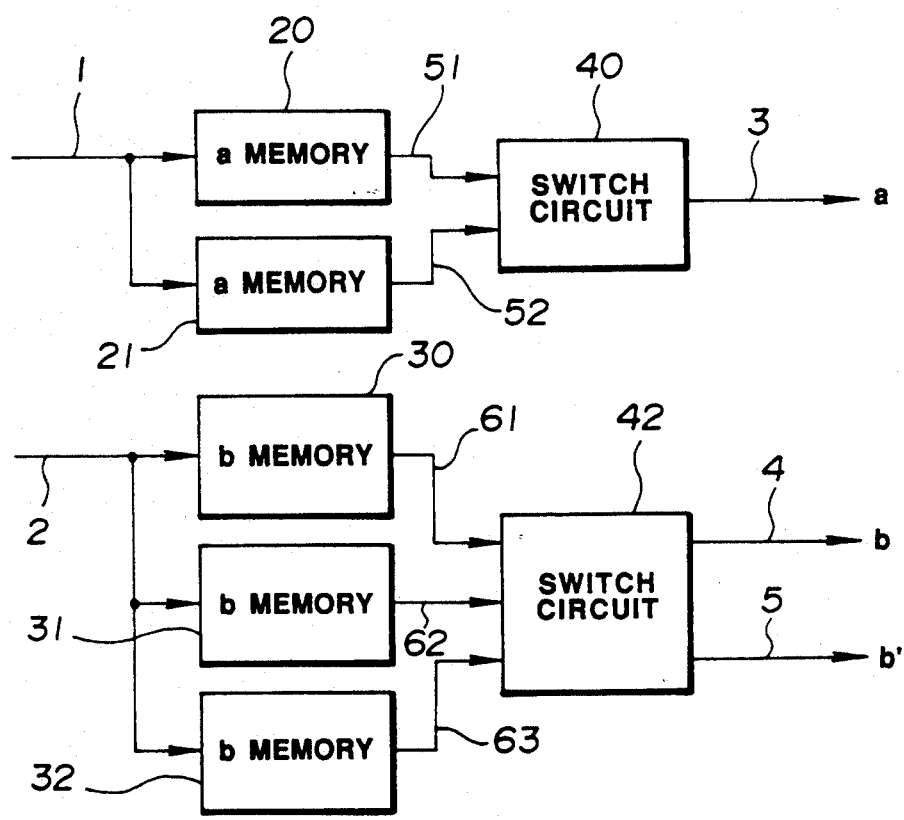
FIG. 2 is a block diagram showing a configuration of a data dividing circuit 114 provided in the motion vector detecting apparatus shown in FIG. 1.

FIG. 1 is a block diagram showing the configuration of a motion detecting apparatus of a first preferred embodiment of the present invention. In FIG. 1, 110 is a current frame memory in which pixel data constituting a frame currently supplied are stored; 111 is a preceding frame memory in which pixel data constituting the preceding frame which had been supplied are stored; 112 designates a motion vector calculation section; 114 designates a data dividing section; and 115 designates a control section. FIG. 2 is a block diagram showing the configuration of the data dividing section 114. As shown in FIG. 2, two cache memories 20 and 21 for input pixel data a, three cache memories 30 through 32 for input pixel data b, and switch circuits 40 and 42 are provided in the data dividing section 114.

In the case where the size of detection block is $M \times M$ and the size of search range is $2M \times 2M$, memories respectively having capacities corresponding to a $2M \times M$ pixel data array are provided as the cache memories 30 through 32. The length 2M described above is coincident with the vertical length of the search range and the length M described above is coincident with the horizontal length thereof. The cache memories 20 and 21 have a storage capacity corresponding to $M \times M$ pixel data, which is the same as the volume of pixel data included in the detection image block.

Pixel data 1 corresponding to a current screen are commonly supplied to the two cache memories 20 and 21. Similarly, pixel data 2 corresponding to the preceding screen are commonly supplied to the three cache memories 30 through 32. The cache memories into which the supplied pixel data are to be written are determined based on address data generated by the control section 115. The switch circuit 40 selects one of the pixel data 51 and 52 read out respectively from cache memories 20 and 21 based on a control signal supplied from the control section 115. The switch circuits 42 selects two pixel data from the three pixel data 61 through 63 supplied respectively from the cache memories 30 through 32 based on a control signal supplied from the control section 115.

FIG. 3 shows the read/write operation of the cache memories 30 through 32 and 20 and 21. Hereinafter, the operation of the motion vector detecting apparatus will be described with reference to FIG. 3. During memory cycle $t_0$, pixel data corresponding to a left half search range $b_0$ are read out from the data memory 111, and the read out pixel data are written in the cache memory 30. During memory cycle $t_0$, the other cache memories are not accessed.

Next, during memory cycle $t_1$, pixel data corresponding to a right half search range $b_1$ are read out from the data memory 111, and the read out pixel data are written in the cache memory 31. Simultaneously, pixel data corresponding to a detection image block $a_0$ are read out from the data memory 111, and the read out pixel data are written in the cache memory 20. Additionally, during the memory cycle $t_1$, the other cache memories are not accessed.

Next, during memory cycle $t_2$, the pixel data corresponding to the range $b_0$ which have been written in the cache memory 30 during the memory cycle $t_0$, and the pixel data corresponding to the ranges $b_1$ and $a_0$ which have been written respectively in the cache memories 31 and 20 during the memory cycle $t_1$ are respectively read out, after which the read out pixel data respectively corresponding to $b_0$, $b_1$ and $a_0$ are supplied to the motion vector calculation section 112 via the data diving section 114, whereby the motion vector is calculated based on the pixel data respectively corresponding to the ranges $b_0$, $b_1$ and $a_0$. Additionally, durring the memory cycle $t_2$, the pixel data corresponding to the left half search range $b_2$ are read out from the data memory 111, and the read out pixel data are written in the cache memory 32, from which data are not being read out. Simultaneously, pixel data corresponding to the direction image block $a_1$ neighboring the above-described detection block $a_0$ are read out from the data memory 111, and the read out pixel data are written in the cache memory 21.

Next, during memory cycle $t_3$, the pixel data respectively corresponding to the right half range $b_1$, left half range $b_2$ and detection image block $a_1$ are read out respectively from the cache memories 31, 32 and 21, after which the motion vector is calculated, based on the read out pixel data, by the calculation section 112. Furthermore, while data are being read out from the cache memories 31, 32 and 21, pixel data corresponding to the range $b_3$ and $a_2$, respectively corresponding to the right half search range and the detection image block neighboring the detection block $a_1$, are read out from the data memory 111, and the read out pixel data respectively corresponding to the ranges $b_3$ and $a_2$ are written respectively in the cache memories 30 and 20 from which data are not being read out. Thereafter, operations similar to the operation described above are repeatedly performed.

Figures 4, 5:
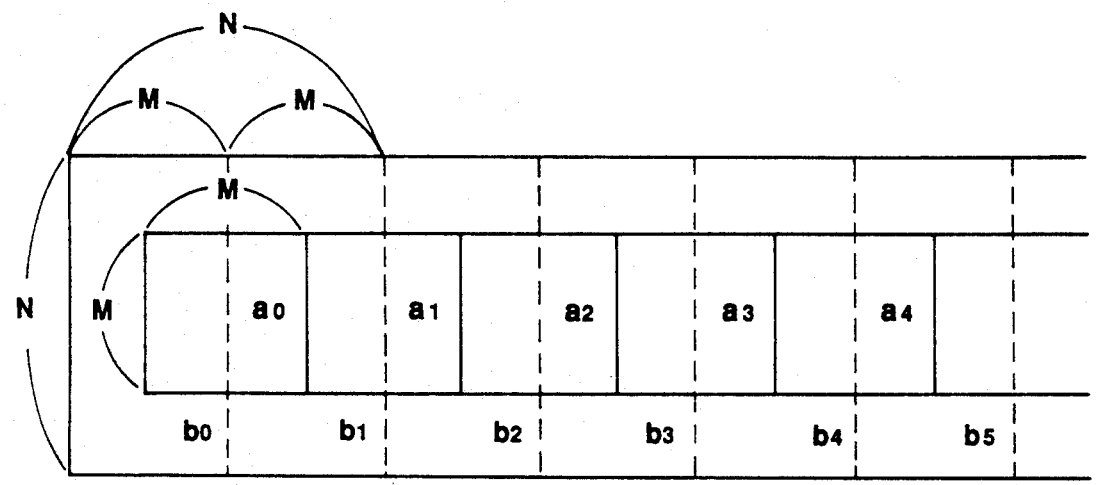

FIG. 4 shows the variation of the search ranges and detection image blocks during memory cycles $t_0$ through $t_4$. In FIG. 4, the two neighboring blocks $b_0$ and $b_1$, which are respectively on the left side of the detection image block $a_0$ and on the right side thereof, are the left half and right half ranges, in which a search is conducted for an image block corresponding to the detection image block $a_0$. Additionally, the two neighboring blocks $b_1$ and $b_2$, which are respectively on the left side of the detection image block $a_1$ and on the right side thereof, are the left half and right half ranges in which a search is conducted for an image block corresponding to the detection image block $a_1$. The relationship described above exists in connection with the other image blocks following the image block $b_2$. The contents of the left half and right half ranges and detection blocks occurring in respective memory cycles are shown in a table format in FIG. 5.

Secondary Preferred Embodiment

Figure 6:
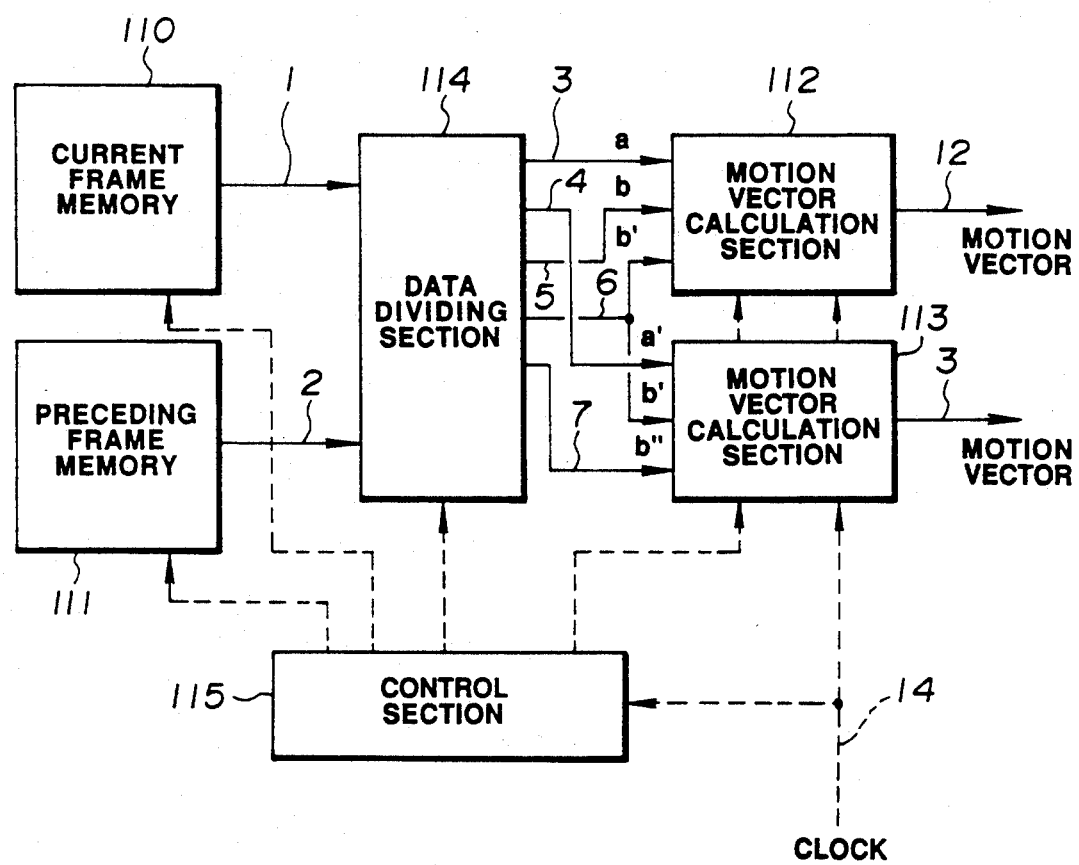
FIG. 6 is a block diagram showing a configuration of a motion vector detecting apparatus according to a second preferred embodiment of the present invention.

FIG. 6 is a block diagram showing a configuration of a motion detecting apparatus of a second preferred embodiment of the present invention. In FIG. 6, two motion vector calculation sections 112 and 113 are provided. Additionally, five cache memories 30 through 34, for storing pixel data corresponding to preceding screen, and four cache memories 20 through 23 for storing pixel data corresponding to the current screen are provided in the data dividing section 114, as shown in FIG. 7. The capacity of each cache memory is the same as that of each cache memory provided in the first preferred embodiment. Furthermore, three switch circuits 40 through 42 are provided in the data dividing section 114. In this way, the number of individual elements are increased in comparison to the first preferred embodiment shown in FIGS. 1 and 2.

Pixel data 1, corresponding to a current screen, is commonly supplied to the four cache memories 20 through 23. Similarly, pixel data 2, corresponding to the preceding screen, is commonly supplied to the five cache memories 30 through 34. The cache memories into which the supplied pixel data are to be written are determined based on address data generated by the control section 115. The switch circuit 40 selects one of the pixel data 51 and 52 read out respectively from cache memories 20 and 21 based on a control signal supplied from the control section 115. Similarly, the switch circuit 41 selects one of the pixel data 53 and 54 supplied respectively from the cache memories 22 and 23. The switch circuits 42 selects three pixel data from the five pixel data 61 through 65 supplied respectively from the cache memories 30 through 34 based on a control signal supplied from the control section 115.

Figure 9:
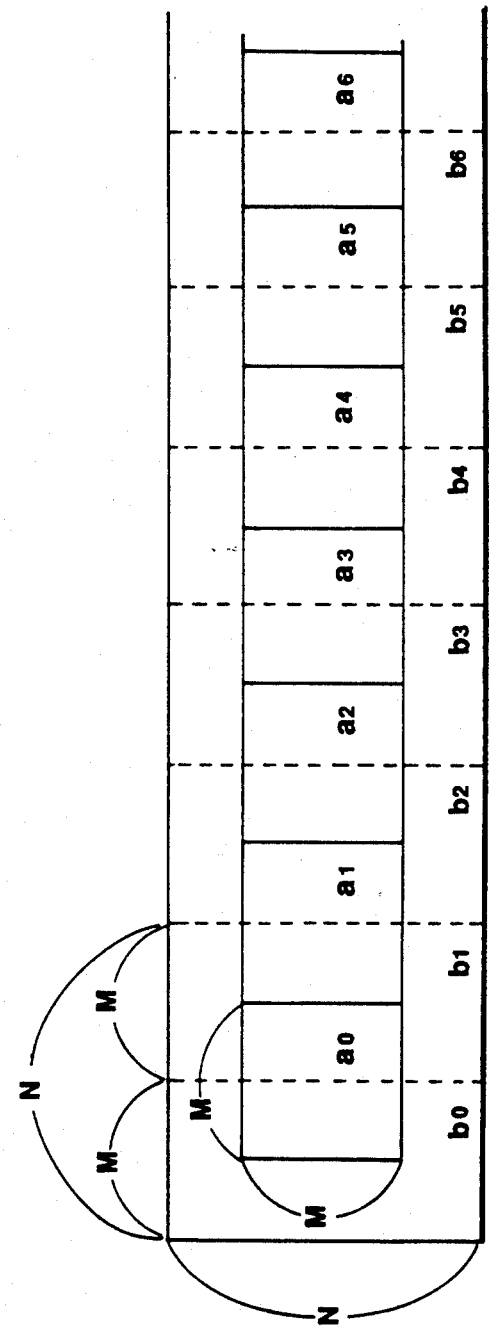
Figure 11:
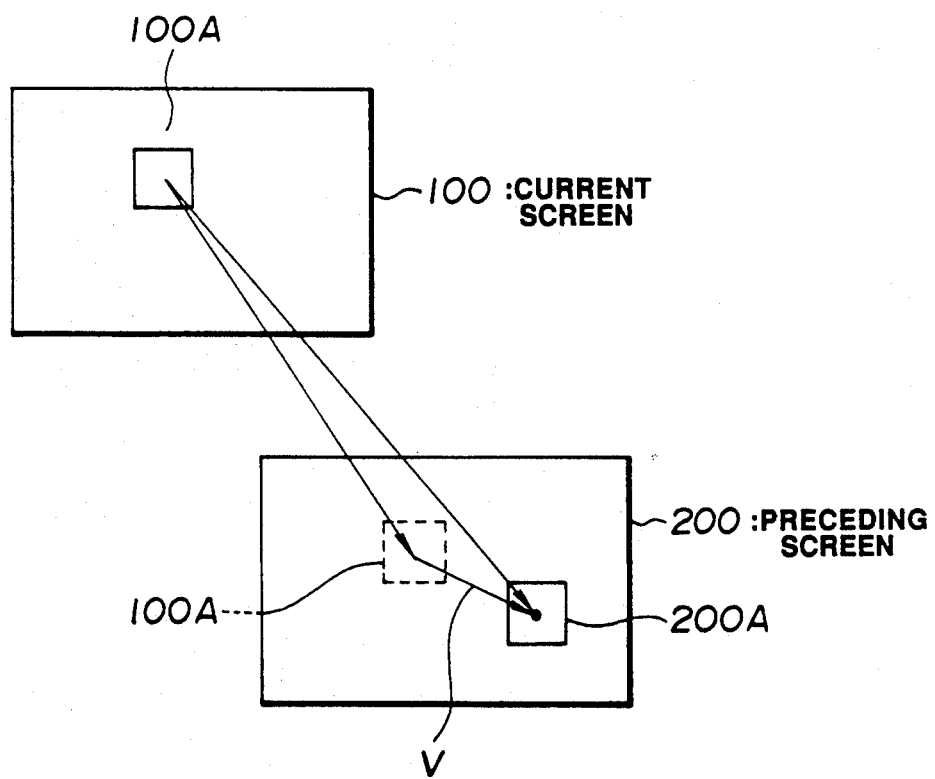
FIG. 11 shows a concept of a motion vector.
Figure 15:
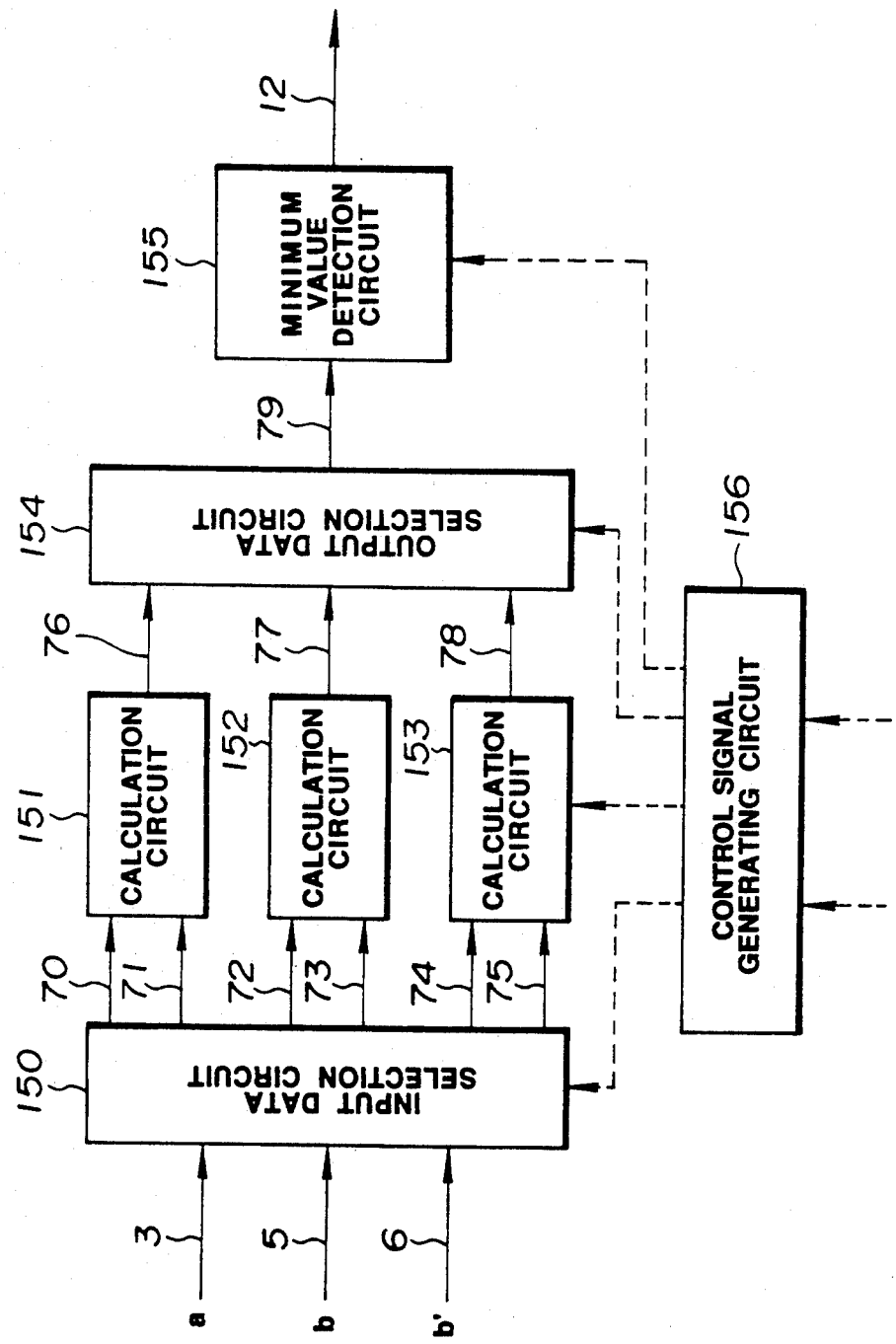
FIG. 15 is a block diagram showing a configuration of a conventional motion vector detecting apparatus.

FIG. 8 shows the read/write operation of the cache memories. Additionally, FIG. 9 shows the variation of search ranges and detection image blocks during the respective memory cycles. Further more, FIG. 10 shows the contents of the left half and right half ranges and detection blocks occurring in respective memory cycles in a table format. Hereinafter, the operation of the motion vector detecting apparatus will be described with reference to these drawings.

During memory cycle $t_0$, pixel data corresponding to the left half search range $b_0$ are written in the cache memory 30. Next, during memory cycle $t_1$, pixel data corresponding to the right half search range $b_1$ are written in the cache memory 31. Simultaneously, pixel data corresponding to the detection image block $a_0$ are written in the cache memory 20. Next, during memory cycle $t_2$, pixel data corresponding to the right half range $b_2$ are written in the cache memory 32, while pixel data corresponding to the detection image block $a_1$ are written in the cache memory 22.

Next, during memory cycle $t_3$, pixel data respectively corresponding to the two neighboring search range $b_0$ and $b_1$ and detection image block $a_0$, which have been stored respectively in the cache memories 30, 31 and 20, are supplied to the motion vector calculation section 112, whereby the motion vector is calculated based on the supplied pixel data. Furthermore, during memory cycle $t_3$, pixel data respectively corresponding to the two neighboring search ranges $b_1$ and $b_2$ and detection image block $a_1$, which have been stored in the cache memories 31, 32 and 22, are supplied to the motion vector calculation section 113, whereby the motion vector is calculated based on the supplied pixel data. Simultaneously, pixel data respectively corresponding to search range $b_3$ and detection image block $a_2$ are read out respectively from the data memory 111 and 110, after which the read out pixel are written respectively in the cache memories 33 and 21, from which data are not being read out.

Next, during memory cycle $t_4$, the motion vector calculation operations which have been performed during memory cycle $t_3$ are maintained, while search range $b_4$ and detection image block $a_3$ are read out respectively from the data memory 111 and 110, after which the read out pixel data are written respectively in the cache memories 34 and 23, from which data are not being read out. Thereafter, operations similar to the operation described above are repeatedly preformed.

What is claimed is:

1. A motion vector detecting apparatrus for detecting motion vectors based on current frame data including a number of pixel data and preceding frame data which had been immediately previously entered thereto, said motion vector detecting apparatus comprising:
   first storing means for storing said current frame data;
   second storing means for storing said preceding frame data;
   first temporary storing means for storing pixel data supplied from said first storing means, said first temporary storing means having a number of a cache memories;
   a number of second temporary storing means for storing pixel data supplied from said second storing means, said second temporary storing means having a number of cache memories;
   acces control means for controlling read and write operations of said first and second storing means and said first and second temporary storing means, said access control means performing a first transfer operation, in which cache memories of said first and second temporary storing means are sequentially selected as input cache memories into which pixel are to be written, and pixel data corresponding to detection image blocks included in said current frame data and pixel data corresponding to neighboring image blocks included in said preceding frame data are transferred respectively from said first and second storing means respectively to the selected input cache memories of said first and second temporary storing means, said access control means further performing a second transfer operation, in which cache memories of said first and second temporary storing means, into which writing is not being conducted, are sequentially selected as output cache memories, from which pixel data are to be read out, and pixel data corresponding to said detection image blocks stored in the selected output cache memories of said first temporary storing means and pixel data corresponding to said neighboring image blocks stored in the selected output cache memories of said second temporary storing means are sequentially read out; and motion vector calculation means for sequentially evaluating the correlation between pixel data read out from said first temporary storing means and pixel data read out from said second temporary storing means, and for detecting said motion vector based on an image block read out from said second temporary means which has the highest correlation.

2. A motion vector detecting apparatus according to claim 1, wherein said motion vector calculation means includes a number of motion vector calculation circuits, whereby said pixel data are alternatively supplied to said motion vector calculation circuits, and motion vectors are calculated by said motion vector calculation circuits in a parallel manner.

3. A motion vector detecting apparatus according to claim 1, wherein a search range surrounding said detection image block is defined, and said second temporary storing means has cache memories for storing pixel data of image blocks included in said search range.

* * * * *